United States Patent
Granston et al.

(10) Patent No.: US 7,673,294 B2
(45) Date of Patent: Mar. 2, 2010

(54) MECHANISM FOR PIPELINING LOOPS WITH IRREGULAR LOOP CONTROL

(75) Inventors: Elana D. Granston, Sugarland, TX (US); Jagadeesh Sankaran, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1080 days.

(21) Appl. No.: 11/334,604

(22) Filed: Jan. 18, 2006

(65) Prior Publication Data

US 2006/0174237 A1 Aug. 3, 2006

Related U.S. Application Data

(60) Provisional application No. 60/645,163, filed on Jan. 18, 2005.

(51) Int. Cl.
*G06F 9/45* (2006.01)
*G06F 9/44* (2006.01)

(52) U.S. Cl. ..................... 717/149; 717/140
(58) Field of Classification Search ................ 717/100, 717/145–151, 159–160, 127, 140
See application file for complete search history.

(56) References Cited

U.S. PATENT DOCUMENTS

| | | | | |
|---|---|---|---|---|
| 5,852,734 | A * | 12/1998 | Komatsu et al. | 717/156 |
| 5,913,925 | A * | 6/1999 | Kahle et al. | 712/206 |
| 5,950,007 | A * | 9/1999 | Nishiyama et al. | 717/161 |
| 6,571,385 | B1 * | 5/2003 | Muthukumar et al. | 717/150 |
| 6,658,471 | B1 * | 12/2003 | Berry et al. | 709/224 |
| 6,826,677 | B2 * | 11/2004 | Topham | 712/217 |
| 6,944,853 | B2 * | 9/2005 | Topham | 717/158 |
| 7,058,604 | B2 * | 6/2006 | Kurumida | 705/50 |
| 7,058,938 | B2 * | 6/2006 | Stringer | 717/161 |
| 7,237,234 | B2 * | 6/2007 | Granston et al. | 717/151 |

OTHER PUBLICATIONS

Larsen et al, "Exploiting vector parallelism in software piplined loops", IEEE, pp. 1-11, 2005.*
Rong et al, "Register allocation for software pipelined multi-dimensional loops", ACM PLDI, pp. 154-167, 2005.*
Rong et al, "Register allocation for software pipelined multi-dimensional loops", ACM Trans. on Prog. Lang. and Systems, vol. 30, No. 4, article 23, pp. 1-68, 2008.*
Park et al, "Evaluation of scheduling techniques on a SPARC based VLIW testbed", IEEE, pp. 104-113, 1997.*

* cited by examiner

*Primary Examiner*—Anil Khatri
(74) *Attorney, Agent, or Firm*—Robert D. Marshall, Jr.; Wade J. Brady, III; Frederick J. Telecky, Jr.

(57) ABSTRACT

This invention modifies an irregular software pipelined loop conditioned upon data in a condition register in a compiler scheduled very long instruction word data processor to prevent over-execution upon loop exit. The method replaces a register modifying instruction with an instruction conditional upon the inverse condition register if possible. The method inserts a conditional register move instruction to a previously unused register within the loop if possible without disturbing the schedule. Then a restoring instruction is added after the loop. Alternatively, both these two functions can be performed by a delayed register move instruction. Instruction insertion is into a previously unused instruction slot of an execute packet. These changes can be performed manually or automatically by the compiler.

4 Claims, 4 Drawing Sheets

MECHANISM FOR PIPELINING LOOPS WITH IRREGULAR LOOP CONTROL

CLAIM OF PRIORITY

This application claims priority under 35 U.S.C. 119(e)(1) to U.S. Provisional Application No. 60/645,163 filed Jan. 18, 2005.

TECHNICAL FIELD OF THE INVENTION

The technical field of this invention is efficient control of irregular software loops.

BACKGROUND OF THE INVENTION

The ability to software pipeline loops is essential to achieving good performance on VLIW architectures. This compiler optimization enables us to more efficiently software pipeline an important class of loops. This new technique is especially beneficial for the class of performance-critical loops which characterize multimedia applications. However, this technique yields improved software pipelining of many other loops as well.

Other solutions either: rely on special purpose hardware to shut off iterations "undo" over-executed instructions; or are software-based as this algorithm but result in less efficient software pipelined schedules.

SUMMARY OF THE INVENTION

In particular, we can now more efficiently pipeline many large irregular While loops. Irregular loops are loops which execute until some condition occurs. Previous software-based techniques for software-pipelining these loops required preprocessing (before generating the software-pipelined schedule) to ensure correctness of the software pipelined schedule. This could lead to less efficient schedules for irregular loops than their regular For loop counterparts.

By exploiting common characteristics of a large class of irregular loops, the new technique is able to effectively process many loops after scheduling rather than before. Thus, where applicable, the new technique yields software pipelining of irregular loops with performance generally comparable to software-pipelined regular loops.

This technique can be applied manually by a programmer or automatically by a compiler. This technique is intended to be applied after scheduling. It can be applied before or after register allocation. No special-purpose hardware is required. Software pipelined schedule is as generally as efficient as those for For loops and often much more efficient than for with previous software-based techniques.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
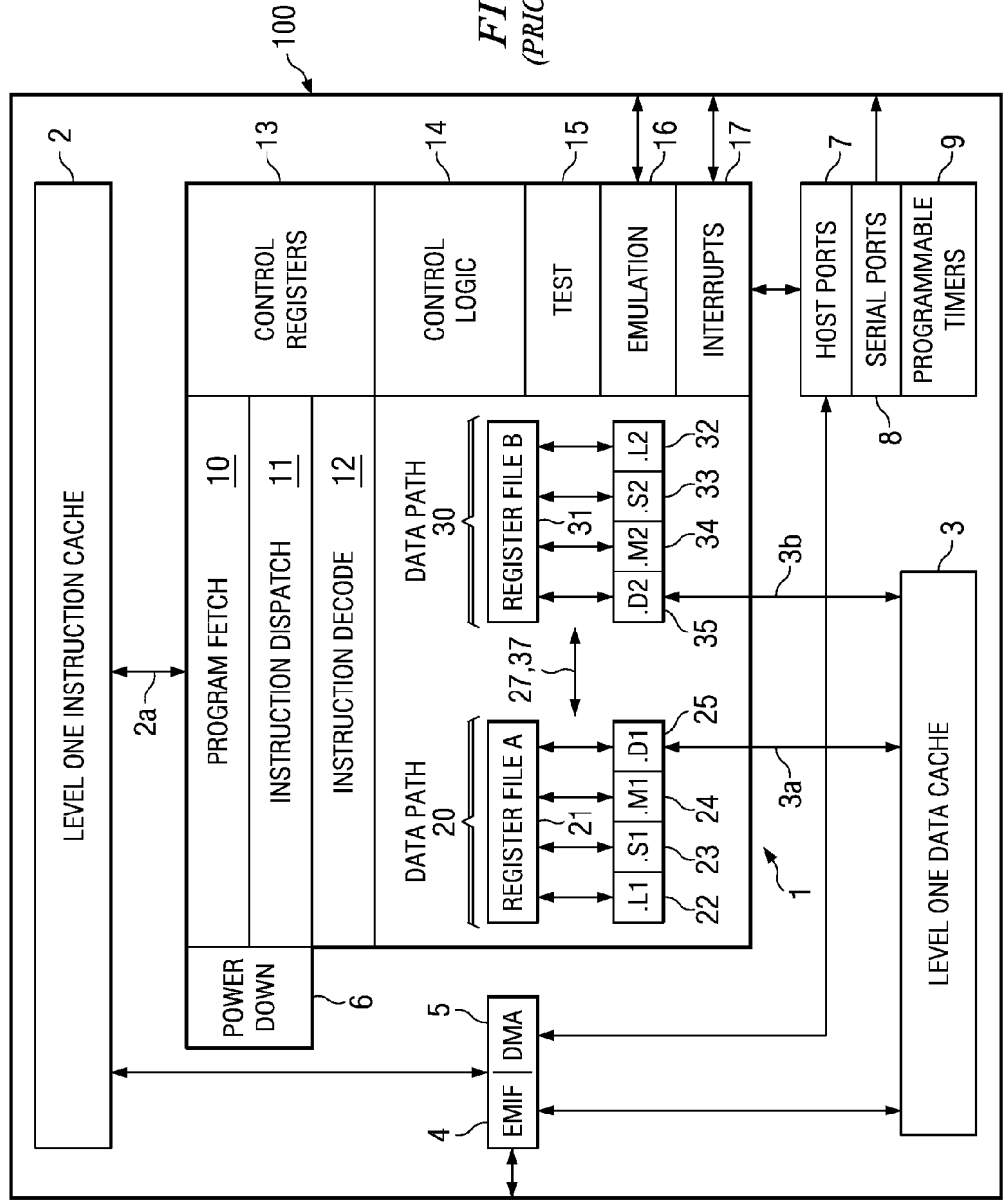
FIG. 1 illustrates details of a very long instruction word digital signal processor integrated circuit suitable for practicing this invention (prior art)

FIG. 1 is a block diagram illustrating details of a digital signal processor integrated circuit 100 suitable but not essential for use in this invention (prior art). The digital signal processor integrated circuit 100 includes central processing unit 1, which is a 32-bit eight-way VLIW pipelined processor. Central processing unit 1 is coupled to level 1 instruction cache 2 included in digital signal processor integrated circuit 100. Digital signal processor integrated circuit 100 also includes level one data cache 3. Digital signal processor integrated circuit 100 also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 3 and a program space including level one instruction cache 2. When off-chip memory is used, preferably these two spaces are unified into a single memory space via the external memory interface (EMIF) 4.

Level one data cache 3 may be internally accessed by central processing unit 1 via two internal ports 3a and 3b. Each internal port 3a and 3b preferably has 32 bits of data and a 32-bit byte address reach. Level one instruction cache 2 may be internally accessed by central processing unit 1 via a single port 2a. Port 2a of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting limited access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 2 and deliver up to eight 32-bit instructions to the functional units every instruction cycle. Processing occurs in each of the two data paths 20 and 30. As previously described above each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 2:
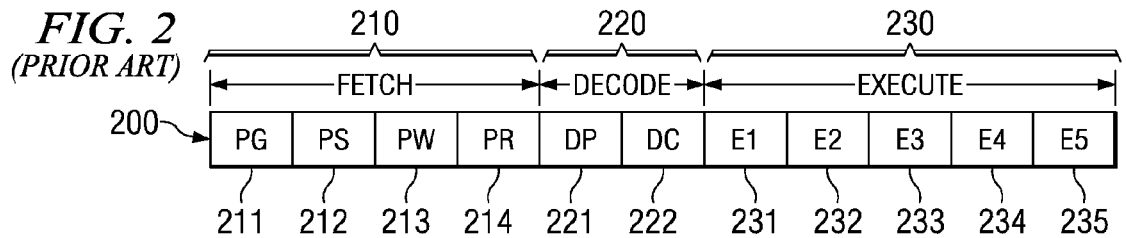
FIG. 2 illustrates the pipeline stages of the very long instruction word digital signal processor integrated circuit illustrated in FIG. 3 (prior art)

FIG. 2 illustrates the pipeline stages 200 of digital signal processor integrated circuit 100 (prior art). These pipeline stages are divided into three groups: fetch group 210; decode group 220; and execute group 230. All instructions in the instruction set flow through the fetch, decode, and execute stages of the pipeline. Fetch group 210 has four phases for all instructions, and decode group 220 has two phases for all instructions. Execute group 330 requires a varying number of phases depending on the type of instruction.

The fetch phases of the fetch group 210 are: Program address generate phase 211 (PG); Program address send phase 212 (PS); Program access ready wait stage 213 (PW); and Program fetch packet receive stage 214 (PR). Digital signal processor integrated circuit 100 uses a fetch packet (FP) of eight instructions. All eight of the instructions proceed through fetch group 210 together. During PG phase 211, the program address is generated in program fetch unit 10. During PS phase 212, this program address is sent to memory. During PW phase 213, the memory read occurs. Finally during PR phase 214, the fetch packet is received at CPU 1.

The decode phases of decode group 220 are: Instruction dispatch (DP) 221; and Instruction decode (DC) 222. During the DP phase 221, the fetch packets are split into execute packets. Execute packets consist of one or more instructions which are coded to execute in parallel. The relationship between a fetch packet and an execute packet will be explained below. During DP phase 222, the instructions in an execute packet are assigned to the appropriate functional units. Also during DC phase 222, the source registers, destination registers and associated paths are decoded for the execution of the instructions in the respective functional units.

The execute phases of the execute group 230 are: Execute 1 (E2) 231; Execute 2 (E2) 232; Execute 3 (E3) 233; Execute 4 (E4) 234; and Execute 5 (E5) 235. Different types of instructions require different numbers of these phases to complete. These phases of the pipeline play an important role in understanding the device state at CPU cycle boundaries.

During E1 phase 231, the conditions for the instructions are evaluated and operands are read for all instruction types. For load and store instructions, address generation is performed and address modifications are written to a register file. For branch instructions, branch fetch packet in PG phase 211 is affected. For all single-cycle instructions, the results are written to a register file. All single-cycle instructions complete during the E1 phase 231.

During the E2 phase 232, for load instructions, the address is sent to memory. For store instructions, the address and data are sent to memory. Single-cycle instructions that saturate results set the SAT bit in the control status register (CSR) if saturation occurs. For single cycle 16×16 multiply instructions, the results are written to a register file. For M unit non-multiply instructions, the results are written to a register file. All ordinary multiply unit instructions complete during E2 phase 222.

During E3 phase 233, data memory accesses are performed. Any multiply instruction that saturates results sets the SAT bit in the control status register (CSR) if saturation occurs. Store instructions complete during the E3 phase 233.

During E4 phase 234, for load instructions, data is brought to the CPU boundary. For multiply extensions instructions, the results are written to a register file. Multiply extension instructions complete during the E4 phase 234.

During E5 phase 235 assuming no memory stall, load instructions write data into a register. Load instructions complete during the E5 phase 235.

Figure 3:
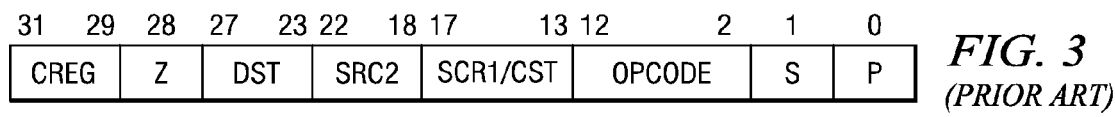
FIG. 3 illustrates the instruction syntax of the very long instruction word digital signal processor integrated circuit illustrated in FIG. 1 (prior art)

FIG. 3 illustrates an example of the instruction coding of instructions used by digital signal processor integrated circuit 100 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field is encoded in the instruction opcode as shown in Table 1.

TABLE 1

| Conditional Register | creg | | | z |
|---|---|---|---|---|
| | 31 | 30 | 29 | 28 |
| Unconditional | 0 | 0 | 0 | 0 |
| Reserved | 0 | 0 | 0 | 1 |
| B0 | 0 | 0 | 1 | z |
| B1 | 0 | 1 | 0 | z |
| B2 | 0 | 1 | 1 | z |
| A1 | 1 | 0 | 0 | z |
| A2 | 1 | 0 | 1 | z |
| A0 | 1 | 1 | 0 | z |
| Reserved | 1 | 1 | 1 | X |

Note that "z" in the z bit column refers to the zero/not zero comparison selection noted above and "X" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 3 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 32 registers in the opposite register file if the instruction invokes one of the register file cross paths 27 or 37.

The opcode field (bits 3 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 30 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

A loop consists of multiple iterations. Normally, the first iteration is completed before the second begins etc. The software pipelining optimization exploits the parallelism in a parallel architecture by initiating the second loop iteration before the first completes and so forth. However, we need to know when to stop initiating new iterations; otherwise, some instructions will be executed more times than necessary. With regular For loops, we know when to stop initiating new iterations because the loop counter increments/decrements by a regular amount until it reaches the termination value.

The examples described below are shown at the source code level for readability. However, this invention is preferably practiced lower down in the compiler at the pseudo-assembly level.

Figure 4:
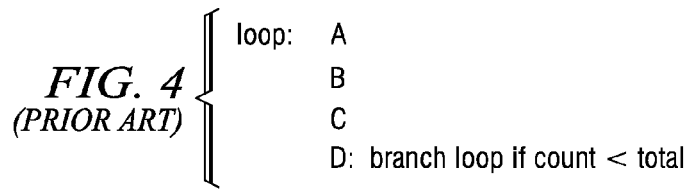
FIG. 4 illustrates an instruction loop (prior art)

FIG. 4 illustrates a loop where a single iteration consists of instructions A, B, C and D. Instruction D is a conditional branch to continue or exit the loop based upon whether the loop count is less than the total. FIG. 4 illustrates how this loop would look in a high level language.

Figure 5:
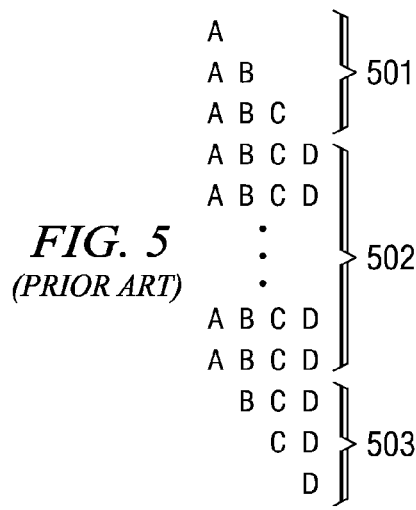
FIG. 5 illustrates a trace of a regular software pipelined loop of FIG. 4 (prior art)

Assume that central processing unit 1 of digital signal processor integrated circuit 100 includes functional units capable of performing each instruction A to D simultaneously absent data dependencies and that register file A 21 and register file B 31 can simultaneously store the variables for four loops. FIG. 5 illustrates a trace of an example software pipelined schedule. During the loop prolog 501 the pipelined loop is begun and new iterations are issued. Each new processor cycle begins another loop with instruction A. Once all new iterations issue, the program moves to loop kernel 502. During the loop kernel 501 the process operates in steady state. Each processor cycle begins a new loop with instruction A and retires a loop at instruction D. A typical process executing on digital signal processor integrated circuit 100 may include hundreds or thousands of processor cycles in loop kernel 502. During loop epilog 503 each processor cycle retires a loop at instruction D. This continues until all loops are retired and the process stops. It is known to provide three separate software modules for the loop prolog 501, the loop kernel 502 and the loop epilog 503. Note that the fact that all instructions of the loop can be scheduled in a single execute packet is only a coincidence in this example. Generally the loop kernel will include plural execute packets with the separate portions of the loop kernel spread over these plural execute packets.

Regular loops are defined as loops where the total number of loop iterations is known in advance, such as illustrated in FIG. 4. Regular loops are generally invoked in a high level language by the For instruction. In such a case it is possible to calculate the number of processor cycles in loop kernel 502. Thus the program can exit loop kernel 502 and enter loop epilog 503 at the proper time to retire the proper number of iterations of the loop.

Figure 6:
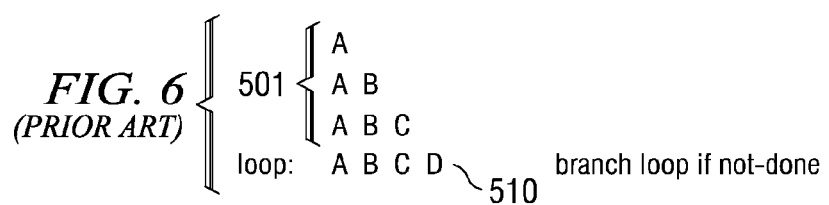
FIG. 6 illustrates an example software pipelined irregular loop executing on a VLIW processor such as illustrated in FIG. 1 (prior art)

In contrast, with irregular loops the number of iterations is not known in advance. The loop continues to operate until the occurrence of an event or condition. Irregular loops are generally invoked in a high level language by the "While" instruction. With irregular loops the time to pipe down is not known. FIG. 6 illustrates the instructions of an irregular software pipelined loop. Prolog 501 is the same as illustrated in FIG. 4. Loop kernel 510 includes all the instructions A, B, C and D. Instruction D is the loop exit condition based upon whether the loop is done. This loop done condition is not based upon a simple count but upon an event or condition.

Figures 7, 9:
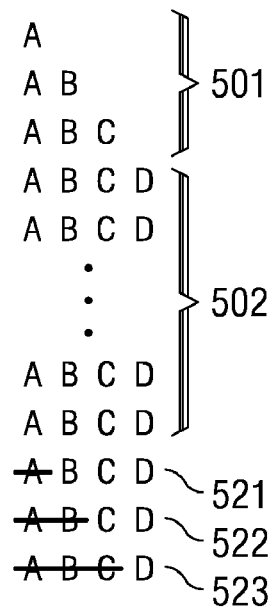
FIG. 7 illustrates a trace of the irregular software pipelined loop of FIG. 6 (prior art)
FIG. 9 illustrates an example of scheduled code as used by the data processor integrated circuit illustrated in FIG. 1.

FIG. 7 illustrates a trace of software pipelined irregular loop of FIG. 6. FIG. 7 illustrates loop prolog 501 and loop kernel 502 as previously shown in FIG. 5. The loop epilog consists of processor cycles 521, 522 and 523. The event or condition is detected by instruction D during the processing cycle 523. Because new iterations were initiated before their predecessors are complete, these new iterations started before the last valid iteration is determined. Thus processor cycle 521 illustrates over executed instruction A. Processor cycle 522 illustrates over executed instructions A and B. Processor cycle 523 illustrates over executed instructions A, B and C. These over executed instructions are needlessly executed because new loops were begun before it was known that a current loop is the last iteration. Care must be taken to make sure that these extra instructions can be safely over-executed without causing incorrect results.

In general, instructions are safe to over-execute unless they modify some machine state, such as a register, data in memory or status registers. Consider the following example function:

```
int dummyfunc(int *a, int n)
{
    for (i=0; i<n && a[i]; i++)
    {
        r0 = 5 * I        // ins 1
        r1 = r0 - 4       // ins 2
        r2 = r1 + r0      // ins 3
        a[i] = r2         // ins 4
        r1 = r2           // ins 5
    }
    return r1
} // end function
```

Instructions 1 and 3 are safe to over-execute because the registers r0 and r2 are not used following the loop. Instruction 4 is not safe to over-execute because it modifies data in memory in the elements of array a. Array a[i] may be read by the caller of dummyfunc( ). Neither instructions 2 nor 5 are safe to over-execute. Register r1 is read after the end of the loop. Over-executing either instruction 2 or instruction 5 could change the value of r1 returned from the function.

There are several ways to prevent instructions from over-executing. One method is to predicate the instruction.

Predicate Method:

```
for (...)
{
    ...
    [p] = (bool) (i<n && a[i])
    [p] r1 = r0 - 4     //   execute instruction only when p
                        //   is true
    ...
    [p] r1 = r2         //   execute instruction only when p
                        //   is true
    ...
}
```

The first listed instruction sets the predicate register p to True while the loop is executing. This example below predicates execution of instructions 2 and 5 on the condition that the loop is still executing. Thus instructions 2 and 5 do not over-execute.

Another option saves the last valid value and restores it if the instruction over-executes. This is called the register copy method.

Register Copy Method:

```
for (...)
{
    ...
    [p] = (bool) (i<n && a[i])
    [p] tmp = r1        //   save valid values of r1
    r1 = r0 - 4         //   safe to over-execute because r1
                        //   is saved in tmp
    ...
    r1 = r2             //   safe to over-execute because r1
                        //   is saved in tmp
}
```

-continued

```
r1 = tmp    //   tmp contains last valid value of
            //   r1 which is copied back to r
            //   after the end of the loop
```

Note that if needed, an inverse of instruction 5 can execute following the loop to recover the value in r2 from over-execution. This would be necessary only if r2 is used following the loop. This option preserves states within the loop for recovery following over-execution after the loop.

The third option uses a delayed move instructions. Some data processor instruction sets, such as the TMS320C64x family of digital signal processors from Texas Instruments Incorporated, include a delayed move instruction which reads the source in one cycle and writes to the destination m cycles later. In this example, a predicated delayed move from r1 to r1 saves the last valid value and then restores in a single instruction. This method is called the delayed move method.

Delayed Move Method:

```
for (...)
{
    ...
    [p] = (bool) (i<n && a[i])
    [!p] delayed_move(r1, r1)  //   save last valid value of r1
    r1 = r0 - 4                //   ok to over-execute write to
                               //   r1 because it will be
                               //   restored later
    ...
    r1 = r2                    //   ok to over-execute write to
                               //   r1 because it will be
                               //   restored later
                               //   m-cycles later,
                               //   delayed_move( ) writes last
                               //   valid value back to r1
}
```

The previously known preprocessing method modifies the instruction stream of the loop body before instruction scheduling. This modification uses either the predicate method or the register copy method to make sure over-execution is safe. It is impossible to know at that point which instructions will be over-executed if any. Thus the preprocessing method must make sure that all instructions can be safely over-executed. This preprocessing algorithm is described below.

Preprocessing Algorithm

This algorithm is applied to the loop body before software pipelining. Let: x be a register storing predicate data which guards the branch instruction in the While loop; and let y be a new register not previously used by the loop body. The preprocessing algorithm used the following steps.

```
0)  add instruction "[!x] zero y" immediately before branch
1)  change "[x] br" to "[y] br"
2)  insert "mv 1, y" immediately preceding loop
3)  live_out = empty set
4)  for each instruction in While loop excluding the branch
    instruction
    {
        let l = the set of registers r which are modified
            by ins and live out of the loop and might be
            used in the same loop iteration after the
            definition at ins
```

-continued

```
            if there is a reason that the instruction cannot
                 be speculatively executed other than the fact
                 that it modifies a register in l
               l = empty set
        if instruction can be speculatively executed
        {
             continue
        }
        else if l is non-empty
        {
             add l to live_out
        }
        else if instruction is unpredicated
        {
             change "ins" to "[y] ins"
        }
        else
        {
             /* instruction is already predicated by [p]    */
             let q = register
             /* can be new register or reuse p */
             add instruction "AND p, y, q" immediately
                 preceding instruction
             if (q != p)
                 change "[p] ins" to "[q] ins"
        }
    } /* end for each */
    4)   for each register r in live_out
    {
        rtmp = new_register( )
        add instruction "[y] mv r, rtmp" preceding
             "[!x] zero y"
        add instruction "mv rtmp, r" following loop
    }
```

In the known preprocessing method, the appropriate one of either predicate method or the register copy method is applied before scheduling. Steps 0, 1 and 2 of the code of this preprocessing method set up the conditions for restoring over-execution. Step 0 adds new loop variable y. Note the zero instruction inserts all 0s into the named register. Step 1 changes the loop branch condition to this new variable. Step 2 initializes y before the loop begins. Step 3 initializes a set variable live_out. Live_out is used to store the identities of registers which must be considered in the altered code. Step 4 considers each instruction in the While loop. Each register that is altered by the instruction and that is used outside the loop is identified. Each such identified register is added to the set 1. If that instruction cannot be speculatively executed, then the set 1 for that instruction is the empty set. If the instruction is unpredicated, then it is changed to be predicated on the register y. If the instruction is already predicated, then a compound predicate instruction is substituted. This new code first ANDs a new predicate register q and the register y to form the prior predicate p. Then the instruction is predicated on this new predication register. Thus this instruction operates as originally coded if the loop exit condition is not met. If the loop exit condition is met, then this instruction does not execute.

Several instructions are added for each register in live-out. A new temporary register is defined for each such register. A predicated move instruction "[y] mv r, rtmp" is added before the added "[!x] zero y" instruction. This saves the value of r in the temporary register rtmp if the loop exit condition is met. Finally, the instruction "mv rtmp, r" instruction is added after the loop. This restores the status of the data in register r upon exit of the loop. This reverses the action of the over-execution in the loop epilog. Following modification as described, the new modified loop is scheduled into execute packets by the compiler.

There are several advantages of this known preprocessing algorithm. This preprocessing algorithm does not need to modify scheduled code, thus avoiding many constraints. This preprocessing algorithm generates software pipelined schedule as with any other loop. There are disadvantages with this known preprocessing algorithm. This preprocessing algorithm adds instructions to the loop. This modified loop when scheduled may require more execute packets than the unmodified loop. This may arise due to the extra instructions alone, from resource constraints within the modified loop and from additional data dependencies within the modified loop. Extra execute packets in the scheduled, modified loop require extra execution time. Since these loops may execute for many iterations, even a small increase in the number of execute packets may adversely change performance. In addition, this preprocessing algorithm requires additional registers relative to the unmodified loop. These additional needed registers may exceed the number available in the data processor. In this case, the preprocessing algorithm may not be used or may require extensive rewriting of the original, unmodified loop.

The present invention called the post-processing algorithm is applied to the original loop scheduled code. This post processing algorithm may be applied before or after register allocation.

Figure 8:
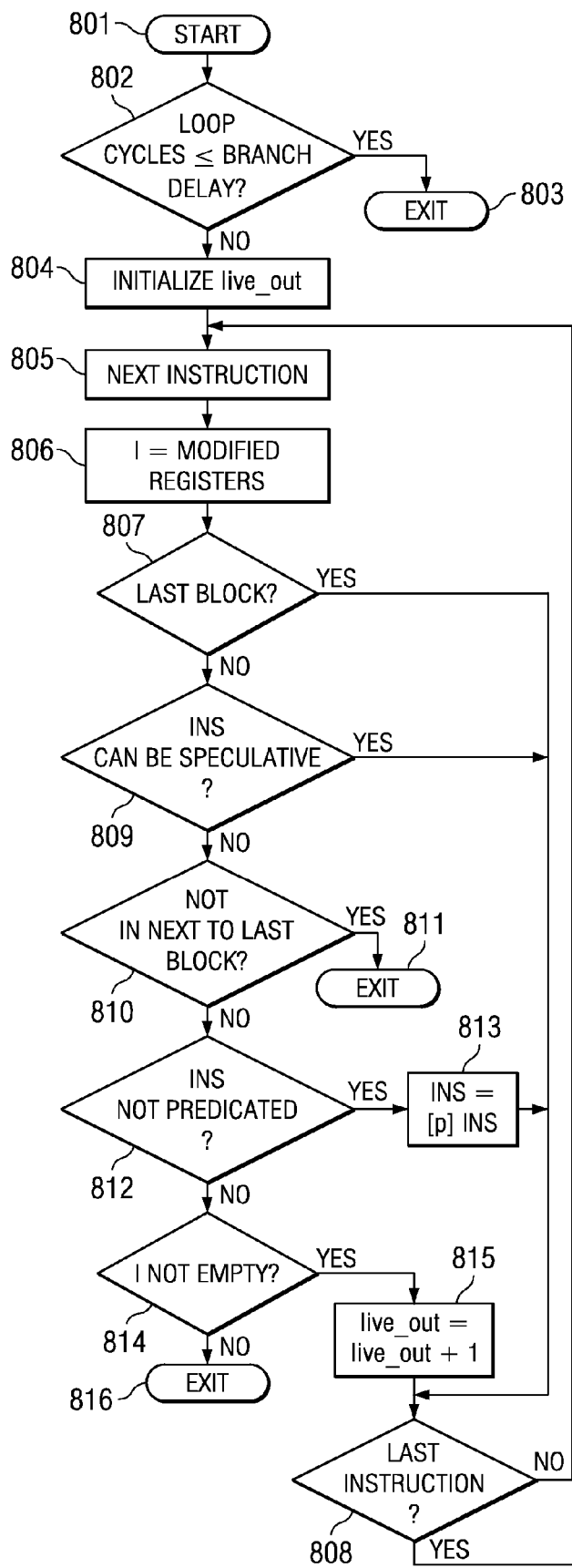
FIG. 8 illustrates the illustrates post-processing algorithm 800 of this invention.
Figure 8:
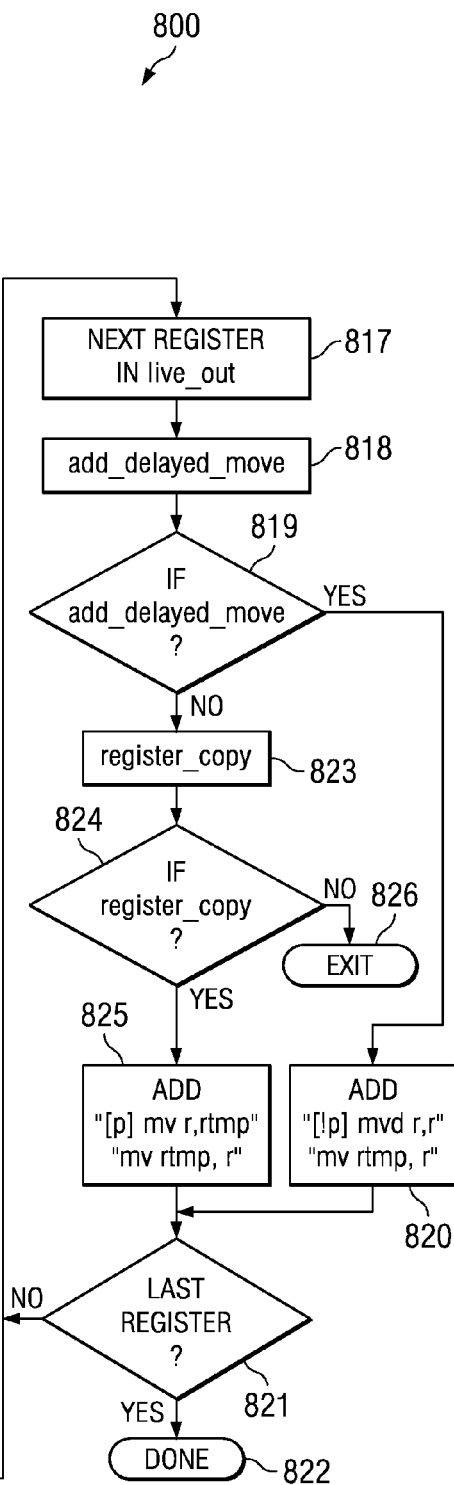

FIG. 8 illustrates post-processing algorithm 800 of this invention. Post-processing algorithm 800 begins at start block 801 after generating the software-pipelining schedule and either before or after register allocation. As in the preprocessing algorithm: let x be the predicate condition which guards branch instruction in the While loop; and let y be a new register.

Test block 802 tests to determine if the cycle count within the loop is less than or equal to number of branch delay slots. If so (Yes at test block 802), then algorithm 800 cannot be used. Algorithm 800 exits at exit block 803. If not true (No at test block 803), then the set variable live_out is initialized at block 804. The set variable live_out serves the same function as previously described.

Block 805 begins a loop for each instruction in the software pipelined While loop. Block 806 inputs to set variable 1 the set of registers r which are modified by the instruction and live out of the loop which might be used in the same loop iteration after the definition at in the current instruction. Test block 807 determines if the instruction is in the last block of the software pipelined loop corresponding to instruction D in the examples above. If so (Yes at test block 806), then algorithm 800 proceeds to the next instruction via test block 808. If that was not the last instruction (No at test block 808), then algorithm 800 goes to the next instruction at block 805. If that was the last instruction (Yes at test block 808), then algorithm 800 proceeds to 817.

If the current instruction was not in the last block (No at test block 807), then algorithm 800 tests to determine if the instruction can be speculatively executed at test block 809. If the current instruction can be speculatively executed (Yes at test block 809), then algorithm 800 proceeds to the next instruction via test block 808. If the current instruction cannot be speculatively executes (No at test block 809), then algorithm 800 proceeds to test block 810.

Algorithm 800 next tests whether the current instruction is not in the next to last block of the software pipelined While loop at test block 810. This is equivalent to whether the instruction is instruction C of the example. If the current instruction is not in the next to last block (Yes at test block 810), then algorithm 800 cannot be used. Algorithm 800 exits at exit block 811. If the current instruction is in the next to last block (No at test block 810), then algorithm 800 proceeds at test block 812.

Test block 812 tests to determine if the current instruction is not predicated and the branch predicate p is valid at that point. If so (Yes at test block 912), then algorithm 800 substitutes an instruction predicated on p for the current instruction at block 813. Algorithm 800 then returns to test block 808. If the current instruction is predicated or the branch predicate is not valid at that point (No at test block 812), then algorithm 800 proceeds at test block 814.

Test block 814 determines whether the set variable 1 is not empty. If not empty (Yes at test block 814), then algorithm 800 adds the registers in set variable 1 to those already stored in set variable live out (live out_out=live_out 1) at block 815. Algorithm 800 then proceeds to test block 808. If set variable 1 is the empty set (No at test block 814), then algorithm 800 cannot be used. Algorithm 800 exits at exit block 816.

After consideration of all the instructions in the software pipelined loop (Yes at test block 808), algorithm 800 proceeds to block 817. This next loop considers each register in the set variable live_out. Block 817 advances to the next register. Block 818 sets a Boolean variable add_delayed_move. If the data processor architecture does not support a predicated delayed move instruction, then block 818 returns a false value for Boolean variable add_delayed_move. Block 818 then checks to determine if one or more delayed moves can be inserted into the scheduled pipeline While loop to read the old value of r before a new value is written and then conditionally restore the old value based upon the branch control variable p. Branch predicate p must be valid at the point that each delayed move is inserted. If this is possible, then block 818 returns a true value for Boolean variable add_delayed_move. Block 818 returns a true value only if this instruction can be inserted without changing the execute packets of the scheduled code. FIG. 9 illustrates an example of scheduled code as used by data processor integrated circuit 100 illustrated in FIG. 1. In many instances all 8 possible instruction issue slots cannot be used each execute packet. This occurs due to data dependencies and resource conflicts. FIG. 9 illustrates: execute packet A consisting of instructions A1, A2, A3, A4 and A5; execute packet B consisting of instructions B1, B2, B3, B4, B5, B6, B7 and B8; execute packet C consisting of instructions C1, C2, C3 and C4; execute packet D consisting of instructions D1, D2, D3, D4, D5, D6 and D7; and execute packet E consisting of instructions E1, E2, E3, E4 and E5. Note that the execute packet boundaries are marked by the p bit of each instruction as illustrated in FIG. 3 and describe above. In this example, execute packet A includes three empty instruction slots 901, execute packet B includes no empty instruction slots, execute packet C includes four empty instruction slots 902, execute packet D includes one empty instruction slot 903 and execute packet E includes three empty instruction slots 904. If feasible, an empty instruction slot such as shown in FIG. 9 is used to insert the delayed move instruction. Otherwise, block 818 returns a false value.

Test block 819 samples the Boolean variable add_delayed_move. If true at test block 819, then algorithm 800 adds instructions to the scheduled pipelined While loop at block 820. The predicated delayed move instruction "[!p] mvd r, r" is added to all the locations found in the search of block 818.

Algorithm 800 then checks to determine if the current register was the last register at test block 821. If the current register was not the last register (No at test block 821), then algorithm 800 returns to consider the next register at block 817. If the current register was the last register (Yes al test block 821), then algorithm 800 is complete and ends at block 822.

If add_delayed_move is false at test block 819, then algorithm 800 sets a Boolean variable register_copy at block 823. Block 823 checks to determine if it is possible to insert an instruction "[p] mv r, rtmp" into scheduled loop iteration after the last definition of r at some point where branch predicate p is valid. If this is possible, then block 823 returns Boolean variable register_copy true. This insertion must be into an unused instruction slot in an execute packet as described above with reference to FIG. 9. Otherwise block 823 returns register_copy as false. Test block 824 determines if Boolean variable register_copy is true. If Boolean variable register_copy is false at test block 824, then algorithm 800 fails and ends at exit block 825. If Boolean variable register_copy is true at test block 824, then block 826 adds two instructions. The instruction "[p] mv r, rtmp" is inserted into the location found in block 823. The instruction "mv rtmp, r" is inserted following the end of the software pipelined While loop. These instructions save the status of register r and restore it if the While loop exits on the current iteration.

This post-processing algorithm applies method 1 (block 813), method 2 (block 825) or method 3 (block 820) after scheduling. This method does not always work. However, when it works it yields a software pipelined loop with instructions protected against over-execution without increasing schedule length. This typically provides much better performance than the known preprocessing method.

What is claimed is:
1. A method of operating a very long instruction word data processor by transforming a compiler scheduled irregular software pipelined loop conditioned upon data in a condition register into a modified irregular software pipelined loop to prevent over-execution upon loop exit consisting of the steps of:

for each instruction within the irregular software pipelined loop determining all modified registers;

determining if an instruction modifying a register can be conditionally executed based upon the condition register;

if an instruction modifying a register can be conditionally executed based upon the condition register, replacing the instruction with a instruction performing the same function conditional upon the inverse of the condition register;

determining if a register move instruction conditional upon the inverse of the condition register can be inserted into the scheduled software pipelined loop without disturbing the schedule;

if a register move instruction conditional upon the inverse of the condition register can be inserted into the scheduled software pipelined loop without disturbing the schedule, inserting a conditional register move instruction from a register modified by a register modifying instruction to an additional previously unused register within the loop into the scheduled software pipelined loop without disturbing the schedule; and controlling operation of the very long instruction word processor using the modified irregular software pipelined loop; and said steps of determining all modified registers, determining if an instruction modifying a register can be conditionally executed based upon the condition register, replacing the instruction, determining if a register move instruction conditional upon the inverse of the condition register can be inserted into the scheduled software pipelined loop without disturbing the schedule and inserting a conditional register move instruction are performed automatically by the compiler.

2. The method of claim 1, wherein:

said conditional register move instruction is a normal register move instruction; and further comprising inserting a register move instruction from the additional register to the register modified by the register modifying instruction following the loop.

3. The method of claim 1, wherein:

the data processor operable to perform a delayed register move instruction which reads a source register in a first instruction cycle and writes to a destination register in a second instruction cycle a predetermined number of instruction cycles later; and said conditional register move instruction is a delayed register move instruction specifying the register modified by the register modifying instruction as both the source register and the destination register.

4. The method of claim 1, wherein: said step of inserting a conditional register move instruction into the scheduled software pipelined loop without disturbing the schedule includes inserting the conditional register move instruction into a previously unused instruction slot of a execute packet consisting of instructions that can execute simultaneously.

* * * * *